W. C. MACHADO.
AUTOMATIC GREASE CUP.
APPLICATION FILED NOV. 27, 1920.
1,394,435. Patented Oct. 18, 1921.
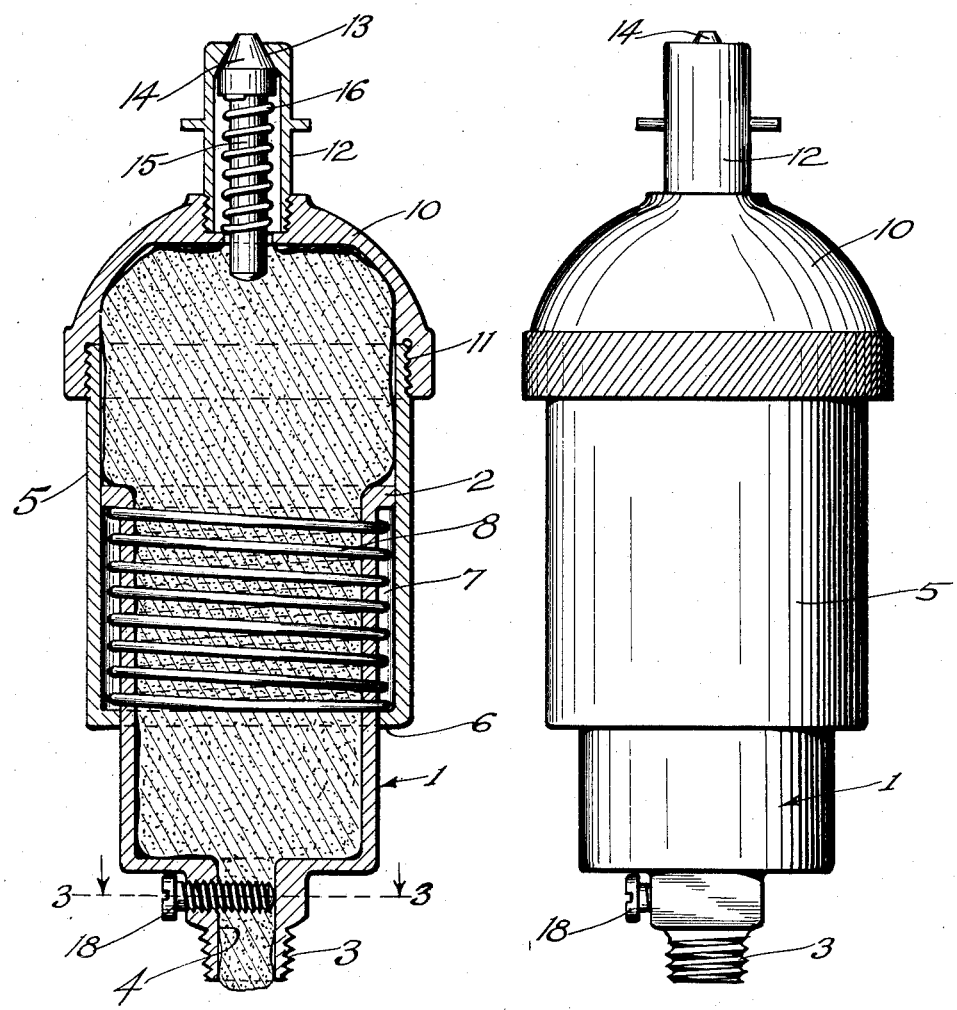
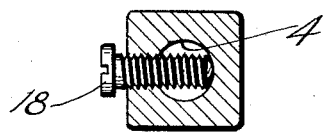
Inventor
WILLIAM C. MACHADO.
BY Hazard & Miller
Attorneys.

UNITED STATES PATENT OFFICE.

WILLIAM CORREY MACHADO, OF MONTECITO, CALIFORNIA, ASSIGNOR OF ONE-HALF TO DIMITRIOS GYMNAITIS, OF SANTA BARBARA, CALIFORNIA.

AUTOMATIC GREASE-CUP.

1,394,435.   Specification of Letters Patent.   Patented Oct. 18, 1921.

Application filed November 27, 1920. Serial No. 426,858.

*To all whom it may concern:*

Be it known that I, WILLIAM CORREY MACHADO, a citizen of the United States, residing at Montecito, in the county of Santa Barbara and State of California, have invented new and useful Improvements in Automatic Grease-Cups, of which the following is a specification.

It is the object of this invention to provide a grease cup in which pressure upon the grease will be automatically maintained as the grease is consumed.

The invention will be readily understood from the following description of the accompanying drawings, in which:

Figure 1 is a side elevation of a grease cup constructed in accordance with the invention.

Fig. 2 is a longitudinal section through the same.

Fig. 3 is a transverse section on the line 3—3 of Fig. 2.

The improved grease cup comprises a lower member 1 having an outturned flange 2 at its open upper end and terminating at its base in a threaded nipple 3 having a bore 4 communicating with the interior of the cup.

An outer shell 5 is received over cup 1 and its lower edge is provided with an inturned flange 6 adapted to engage cup 1. By this arrangement an annular space 7 is provided between shell 5 and cup 1, and the ends of this space are closed by flanges 2 and 6. A coil spring 8 is received in this space surrounding cup 1 with the ends of the spring abutting against the respective flanges 2 and 6. By this arrangement the spring will tend to draw shell 5 downwardly upon cup 1.

A closure cap 10 is threaded on to the upper end of shell 5 as shown at 11, and a check valve of usual construction is preferably threaded into cap 10, so that grease may be forced into the grease cup in usual manner. This check valve comprises a tube 12 forming a valve seat 13 and having the valve head 14 carried by valve stem 15 cooperating with the valve seat and arranged within the valve tube. The valve is yieldably held closed by means of a spring 16 coiled around valve stem 15.

The grease cup is mounted upon any bearing or the like to which grease is to be supplied by threading nipple 3 into a corresponding threaded recess. The discharge of grease from the cup is controlled by a screw 18 threaded through nipple 3 and extending across bore 4. The screw is arranged so as to never completely close bore 4, but will vary the size of the opening through the bore as it is threaded in and out. Grease is forced into the cup in usual manner past the check valve provided upon cap 10, and the spring 8 will tend to force shell 5 and cap 10 downwardly upon cup 1 so that cap 10 will exert pressure against the grease within the cup for forcing the grease outwardly through the discharge nipple 3.

It will be understood that the grease within the cup will hold shell 5 and its cap 10 from collapsing upon cup 1 through the tension of spring 8, and that as the grease is consumed from the cup, the spring 8 will draw the shell and cap down upon the cup 1 a corresponding distance, so as to maintain the pressure against the grease within the cup.

Various changes may be made without departing from the spirit of the invention as claimed.

What is claimed is:

A grease cup having an outturned upper edge, a closure head received over said cup and having an inturned lower edge, a spring positioned in the space between said cup and head with said spring abutting against said outturned and inturned edges for yieldably forcing said closure head downwardly upon said cup, a valve at the lower end of said cup for controlling the discharge of grease therefrom, and an inwardly opening spring pressed check valve arranged in the upper end of the closure head.

In testimony whereof I have signed my name to this specification.

WILLIAM CORREY MACHADO.